United States Patent
Hua et al.

(10) Patent No.: US 10,821,712 B2
(45) Date of Patent: Nov. 3, 2020

(54) LOW CRYSTALLINE POLYPROPYLENE-BASED POLYMER FOR BLOWN FILM APPLICATIONS

(71) Applicant: ExxonMobil Chemical Patents Inc., Baytown, TX (US)

(72) Inventors: Haiyin Hua, Shanghai (CN); Bin Zhao, Songjing (CN); Achiel J. M. Van Loon, Antwerp (BE)

(73) Assignee: ExxonMobil Chemical Patents Inc., Baytown, TX (US)

(*) Notice: Subject to any disclaimer, the term of this patent is extended or adjusted under 35 U.S.C. 154(b) by 250 days.

(21) Appl. No.: 15/963,175

(22) Filed: Apr. 26, 2018

(65) Prior Publication Data

US 2018/0354239 A1    Dec. 13, 2018

Related U.S. Application Data

(60) Provisional application No. 62/518,809, filed on Jun. 13, 2017.

(51) Int. Cl.
- *B32B 27/08* (2006.01)
- *B32B 27/32* (2006.01)
- *B32B 27/36* (2006.01)

(52) U.S. Cl.
CPC .............. *B32B 27/08* (2013.01); *B32B 27/32* (2013.01); *B32B 27/36* (2013.01); *B32B 2250/05* (2013.01); *B32B 2270/00* (2013.01); *B32B 2323/04* (2013.01); *B32B 2323/10* (2013.01); *B32B 2367/00* (2013.01); *B32B 2439/00* (2013.01)

(58) Field of Classification Search
CPC . B32B 2250/05; B32B 2439/00; B32B 27/08; B32B 27/32; B32B 27/36; B32B 2270/00; B32B 2323/04; B32B 2323/10; B32B 2367/00; B29K 2823/08; B29K 2823/16; C09J 7/243; C08F 297/083

See application file for complete search history.

(56) References Cited

U.S. PATENT DOCUMENTS

| | | | |
|---|---|---|---|
| 2003/0211350 A1* | 11/2003 | Migliorini | B32B 27/08 428/515 |
| 2005/0238874 A1* | 10/2005 | Pellingra, Jr. | B32B 37/153 428/349 |
| 2010/0015423 A1 | 1/2010 | Schaefer et al. | |
| 2010/0215933 A1* | 8/2010 | Fiscus | B32B 27/16 428/220 |
| 2011/0258969 A1* | 10/2011 | Breck | B65B 51/10 53/451 |
| 2012/0329351 A1* | 12/2012 | Mehta | D04H 1/00 442/328 |
| 2013/0202904 A1* | 8/2013 | Gohr | B32B 27/32 428/515 |
| 2014/0072787 A1* | 3/2014 | Gargalaka, Jr. | B32B 27/08 428/218 |
| 2015/0158235 A1* | 6/2015 | Van Loon | B32B 27/32 428/218 |

(Continued)

FOREIGN PATENT DOCUMENTS

WO    2010/008696 A    1/2010

*Primary Examiner* — Travis M Figg

(57) ABSTRACT

Disclosed are methods for making a multilayer blown film comprising a propylene-based elastomer in the skin and/or subskin layers.

20 Claims, 13 Drawing Sheets

(56) References Cited

U.S. PATENT DOCUMENTS

2017/0066894 A1\* 3/2017 Williams ............ C08L 23/0815
2017/0136745 A1\* 5/2017 Breck ..................... B65B 51/10
2017/0342249 A1\* 11/2017 Zhao ..................... B32B 27/327
2017/0346205 A1 11/2017 Eriksson et al.

\* cited by examiner

FIG. 4A

Legend:
- no peeling
- peeling (>0%)
- overseal (x)

1 — Exceed 1012 skin / Exceed 1012 sub-skin

| °C \ msec | 150 | 200 | 250 | 300 | 350 | 400 | 450 | 500 | 550 | 600 |
|---|---|---|---|---|---|---|---|---|---|---|
| 140 | x | x | o | o | o | o | o | o | o | o |
| 130 | x | x | o | o | o | o | o | o | o | o |
| 120 | x | x | x | o | o | o | o | o | o | o |
| 110 | x | x | x | x | x | o | o | o | o | o |

2 — Exceed 1012 skin / Exceed 9061 sub-skin

| °C \ msec | 150 | 200 | 250 | 300 | 350 | 400 | 450 | 500 | 550 | 600 |
|---|---|---|---|---|---|---|---|---|---|---|
| 140 | o | o | o | o | o | o | o | o | x | x |
| 130 | x | o | o | o | o | o | o | o | o | o |
| 120 | x | x | o | o | o | o | o | o | o | o |
| 110 | x | x | x | o | o | o | o | o | o | o |

3 — Exceed 1012 skin / Vistamaxx 6102 sub-skin

| °C \ msec | 150 | 200 | 250 | 300 | 350 | 400 | 450 | 500 | 550 | 600 |
|---|---|---|---|---|---|---|---|---|---|---|
| 140 | o | o | o | o | o | o | o | o | o | o |
| 130 | x | o | o | o | o | o | o | o | o | o |
| 120 | x | x | o | o | o | o | o | o | o | o |
| 110 | x | x | x | o | o | o | o | o | o | o |

Legend:
- no peeling
- peeling (>0%)
- overseal

1  Exceed 1012 skin / Exceed 1012 sub-skin

| °C  | 150 | 200 | 250 | 300 | 350 | 400 | 450 | 500 | 550 | 600 | msec |
|-----|-----|-----|-----|-----|-----|-----|-----|-----|-----|-----|------|
| 140 | x   | x   | o   | o   | o   | o   | o   | o   | o   | o   |      |
| 130 | x   | x   | o   | o   | o   | o   | o   | o   | o   | o   |      |
| 120 | x   | x   | x   | o   | o   | o   | o   | o   | o   | o   |      |
| 110 | x   | x   | x   | x   | x   | o   | o   | o   | o   | o   |      |

6  Exceed 1012 skin / Vistamaxx 6102 sub-skin

| °C  | 150 | 200 | 250 | 300 | 350 | 400 | 450 | 500 | 550 | 600 | msec |
|-----|-----|-----|-----|-----|-----|-----|-----|-----|-----|-----|------|
| 140 | o   | o   | o   | o   | o   | o   | o   | o   | o   | o   |      |
| 130 | x   | o   | o   | o   | o   | o   | o   | o   | o   | o   |      |
| 120 | x   | o   | o   | o   | o   | o   | o   | o   | o   | o   |      |
| 110 | x   | x   | x   | o   | o   | o   | o   | o   | o   | o   |      |

13  Vistamaxx 3588 skin / Vistamaxx 6102 sub-skin

| °C  | 150 | 200 | 250 | 300 | 350 | 400 | 450 | 500 | 550 | 600 | msec |
|-----|-----|-----|-----|-----|-----|-----|-----|-----|-----|-----|------|
| 140 | o   | o   | o   | o   | o   | o   | o   | o   | o   | o   |      |
| 130 | o   | o   | o   | o   | o   | o   | o   | o   | o   | o   |      |
| 120 | x   | o   | o   | o   | o   | o   | o   | o   | o   | o   |      |
| 110 | x   | x   | o   | o   | o   | o   | o   | o   | o   | o   |      |

Exceed 1012 skin / Exceed 1012 sub-skin

| °C \ msec | 150 | 300 | 450 | 600 |
|---|---|---|---|---|
| 140 | 0.4 | 0 | 0 | 0 |
| 120 | 2 | 1 | 0.6 | 0 |
| 100 |  | 2 | 1.8 | 1.4 |
| 90 |  |  |  | 3 |

300 mbar — 600 mbar

Exceed 1012 skin / Exceed 9061 sub-skin

| °C \ msec | 150 | 300 | 450 | 600 |
|---|---|---|---|---|
| 140 | 1 | 0 | 0 | 0 |
| 120 | 1.8 | 0.8 | 0.6 | 0.4 |
| 100 |  | 2 | 1.6 | 0.8 |
| 90 |  |  |  |  |

300 mbar — 600 mbar

Exceed 1012 skin / Vistamaxx 6102 sub-skin

| °C \ msec | 150 | 300 | 450 | 600 |
|---|---|---|---|---|
| 140 | 0.6 | 0 | 0 | 0 |
| 120 | 1.2 | 0.8 | 0.6 | 0.2 |
| 100 |  | 2.6 | 1.6 | 1.2 |
| 90 |  |  |  |  |

300 mbar — 600 mbar

1

| msec | 150 | 300 | 450 | 600 |
|---|---|---|---|---|
|  |  | 0.2 | 0 | 0 |
|  | 2 | 2 | 2 | 1.6 |
|  |  |  |  |  |
|  |  |  |  |  |

600 mbar

2

| msec | 150 | 300 | 450 | 600 |
|---|---|---|---|---|
|  |  | 0.4 | 0 |  |
|  | 2 | 2 | 2 | 1.4 |
|  |  |  |  |  |
|  |  |  |  |  |

600 mbar

3

| msec | 150 | 300 | 450 | 600 |
|---|---|---|---|---|
|  |  | 0 | 0 | 0 |
|  | 2 | 1.8 | 1.6 | 0.8 |
|  |  |  |  |  |
|  |  |  |  |  |

600 mbar

| °C | Exceed 1012 skin / Exceed 1012 sub-skin | | | | | | | | | |
|---|---|---|---|---|---|---|---|---|---|---|
| 140 | 0.4 | 0 | 0 | 0 | | | 2 | 0.2 | 0 | 0 |
| 120 | 2 | 1 | 0.6 | 0 | | | 2 | 2 | 2 | 1.6 |
| 100 | | 2.6 | 1.8 | 1.4 | | 1 | | | | |
| 90 | | | | 3 | | | | | | |
| 300 mbar | 150 | 300 | 450 | 600 | msec | | 150 | 300 | 450 | 600 | 600 mbar |

| °C | Exceed 1012 skin / Vistamaxx 6102 sub-skin | | | | | | | | | |
|---|---|---|---|---|---|---|---|---|---|---|
| 140 | 0.6 | 0 | 0 | 0 | | | 2 | 0 | 0 | 0 |
| 120 | 1.2 | 0.8 | 0.6 | 0.2 | | | | 1.8 | 1.6 | 0.8 |
| 100 | | 2.6 | 1.6 | 1.2 | | 6 | | | | |
| 90 | | | | | | | | | | |
| 300 mbar | 150 | 300 | 450 | 600 | msec | | 150 | 300 | 450 | 600 | 600 mbar |

| °C | Vistamaxx 3588 skin / Vistamaxx 6102 sub-skin | | | | | | | | | |
|---|---|---|---|---|---|---|---|---|---|---|
| 140 | 0.4 | 0 | 0 | 0 | | | 1.4 | 0.2 | 0 | 0 |
| 120 | 1 | 0.2 | 0.2 | 0 | | | | 2.4 | 2 | 0.4 |
| 100 | | | 1.4 | 0.8 | | 13 | | | | |
| 90 | | | | | | | | | | |
| 300 mbar | 150 | 300 | 450 | 600 | msec | | 150 | 300 | 450 | 600 | 600 mbar |

FIG. 6B

LOW CRYSTALLINE POLYPROPYLENE-BASED POLYMER FOR BLOWN FILM APPLICATIONS

CROSS-REFERENCE OF RELATED APPLICATION

This application claims the benefit of US Provisional Application No. 62/518,809, filed Jun. 13, 2017.

FIELD OF THE INVENTION

This invention relates to a multilayer blown film formulation with good sealant and packaging properties.

BACKGROUND OF THE INVENTION

Manufacturing of blown films and the equipment for making them are well known in the art. Multilayer films in which at least one surface or outer layer is made to facilitate heat-sealing are also known. Flexible packaging is an important application where sealing and packaging properties are key to the end user. These properties are critical in prolonging shelf-life, protecting packaged goods, and making the packaging process more efficient. To address these properties, low crystalline polymer material is typically used in the sealant skin layer. However, incorporating these materials can hinder the film blowing and processing. Therefore, a need exists to achieve suitable sealing and packaging properties of films without sacrificing processability and machinability.

The inventors have discovered a 5-layer blown film technology having a relatively high crystalline material in the sealant skin layer and a low crystalline material in the subskin layer. The low crystalline material in the subskin layer assists with improving sealing and packaging properties, while the relatively high crystalline material in the sealant layer assists with processability and machinability.

SUMMARY OF THE INVENTION

In one aspect, embodiments herein describe a multilayer film, comprising an outer layer comprising about 15 wt % to about 30 wt % of a first ethylene copolymer and about 70 wt % to about 85 wt % of a second ethylene copolymer, where the first and second ethylene copolymer are not the same; an inner layer, adjacent to the outer layer, wherein the inner layer is the same or different from the outer layer; a core layer, adjacent to the inner layer, comprising about 20 wt % to about 40 wt % of a polyethylene homopolymer, about 0.5 wt % to about 5 wt % of a slip additive, and about 55 wt % to about 79.5 wt % of a third ethylene copolymer; a subskin layer, adjacent to the core layer; and a skin layer, adjacent to the subskin layer; wherein the subskin polymer material of the skin layer is selected from a third ethylene copolymer and a propylene-based elastomer; and wherein the melting temperature of the subskin layer is less than the melting temperature of the core layer and the melting temperature of the skin layer.

BRIEF DESCRIPTION OF THE DRAWINGS

FIG. 4A and FIG. 4B depict the vertical form fill seal hot tack test of films.

FIG. 6A and FIG. 6B depict the hermeticity of inventive and comparative films.

DETAILED DESCRIPTION OF THE PRESENT INVENTION

Figure 1A:
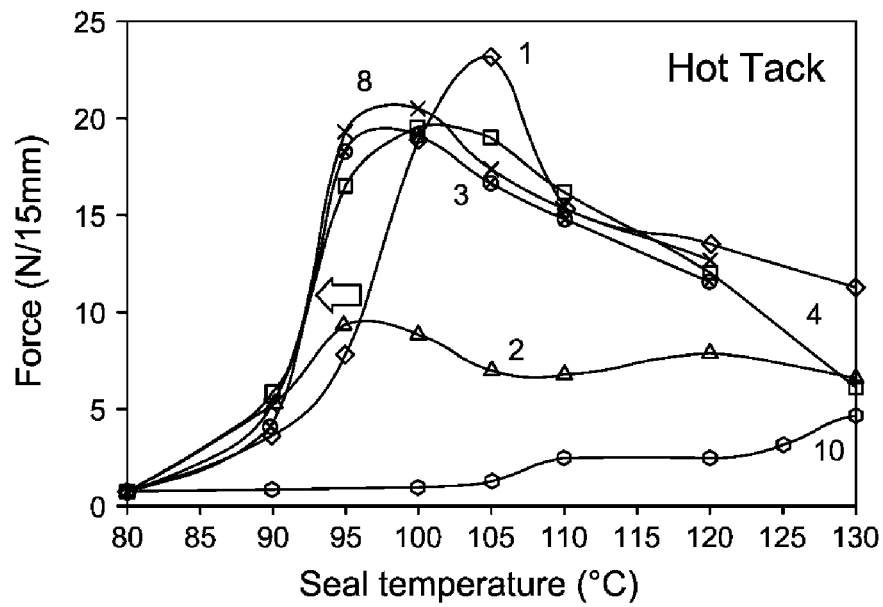
FIG. 1A, FIG. 1B, FIG. 1C, and FIG. 1D depict the hot tack force of inventive and comparative films.

Various specific embodiments, versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the present inventions defined by the claims. The use of headings is for purposes of convenience only and does not limit the scope of the present invention.

As used herein, a "polymer" may be used to refer to homopolymers, copolymers, interpolymers, terpolymers, etc. A "polymer" has two or more of the same or different monomer units. A "homopolymer" is a polymer having monomer units that are the same. A "copolymer" is a polymer having two or more monomer units that are different from each other. A "terpolymer" is a polymer having three monomer units that are different from each other. The term "different" as used to refer to monomer units indicates that the monomer units differ from each other by at least one atom or are different isomerically. Accordingly, the definition of copolymer, as used herein, includes terpolymers and the like. Likewise, the definition of polymer, as used herein, includes copolymers and the like. Thus, as used herein, the terms "polyethylene," "ethylene polymer," "ethylene copolymer," and "ethylene based polymer" mean a polymer or copolymer comprising at least 50 mol % ethylene units (preferably at least 70 mol % ethylene units, more preferably at least 80 mol % ethylene units, even more preferably at least 90 mol % ethylene units, even more preferably at least 95 mol % ethylene units or 100 mol % ethylene units (in the case of a homopolymer)). Furthermore, the term "polyethylene composition" means a composition containing one or more polyethylene components.

As used herein, when a polymer is referred to as comprising a monomer, the monomer is present in the polymer in the polymerized form of the monomer or in the derivative form of the monomer.

As used herein, when a polymer is said to comprise a certain percentage, wt %, of a monomer, that percentage of monomer is based on the total amount of monomer units in the polymer.

As used herein, "elastomer" or "elastomeric composition" refers to any polymer or composition of polymers (such as blends of polymers) consistent with the ASTM D1566 definition. Elastomer includes mixed blends of polymers such as melt mixing and/or reactor blends of polymers.

For purposes of this invention, an ethylene polymer having a density of 0.86 g/cm$^3$ or less is referred to as an "ethylene elastomer"; an ethylene polymer having a density of more than 0.86 to less than 0.910 g/cm$^3$ is referred to as an "ethylene plastomer"; an ethylene polymer having a density of 0.910 to 0.940 g/cm$^3$ is referred to as a "low density polyethylene" (LDPE), or "linear low density polyethylene" (LLDPE), or "metallocene linear low density polyethylene" (mLLDPE); and an ethylene polymer having a density of more than 0.940 g/cm$^3$ is referred to as a "high density polyethylene" (HDPE).

Polyethylene having a density of 0.890 to 0.930 g/cm$^3$, typically from 0.915 to 0.930 g/cm$^3$, that is linear and does not contain long-chain branching is referred to as "linear low density polyethylene" (LLDPE) and can be produced with conventional Ziegler-Natta catalysts, vanadium catalysts, or with metallocene catalysts in gas phase reactors and/or in slurry reactors and/or with any of the disclosed catalysts in solution reactors. "Linear" means that the polyethylene has no or only a few long-chain branches, typically referred to as a g'vis of 0.97 or above, preferably 0.98 or above.

As used herein, "skin" layer or "subskin" layer are merely identifiers used for convenience, and shall not be construed as limitation on individual layers, their relative positions, or the laminated structure, unless otherwise specified.

As used herein, film layers that are the same in composition and in thickness are referred to as "identical" layers.

As used herein, a "comparative film" refers to a film free of the subskin and/or skin layer comprising one or more propylene-based elastomers compared to the referenced film.

As used herein, a film "free of the core layer comprising the propylene-based elastomer" described herein refers to a film substantially devoid of such core layer, or comprising such core layer in an amount of less than about 1%, by volume of the total film.

Propylene-Based Elastomer

The propylene-based elastomer is a copolymer of propylene-derived units and units derived from at least one of ethylene or a $C_4$-$C_{10}$ alpha-olefin. The propylene-based elastomer may contain at least about 50 wt % propylene-derived units. The propylene-based elastomer may have limited crystallinity due to adjacent isotactic propylene units and a melting point as described herein. The crystallinity and the melting point of the propylene-based elastomer can be reduced compared to highly isotactic polypropylene by the introduction of errors in the insertion of propylene. The propylene-based elastomer is generally devoid of any substantial intermolecular heterogeneity in tacticity and comonomer composition, and also generally devoid of any substantial heterogeneity in intramolecular composition distribution.

The amount of propylene-derived units present in the propylene-based elastomer may range from an upper limit of about 95 wt %, about 94 wt %, about 92 wt %, about 90 wt %, or about 85 wt %, to a lower limit of about 60 wt %, about 65 wt %, about 70 wt %, about 75 wt %, about 80 wt %, about 84 wt %, or about 85 wt %, of the propylene-based elastomer.

The units, or comonomers, derived from at least one of ethylene or a $C_4$-$C_{10}$ alpha-olefin may be present in an amount of about 1 wt % to about 35 wt %, or about 5 wt % to about 35 wt %, or about 7 wt % to about 30 wt %, or about 8 wt % to about 25 wt %, or about 8 wt % to about 20 wt %, or about 8 wt % to about 18 wt %, of the propylene-based elastomer. The comonomer content may be adjusted so that the propylene-based elastomer has a heat of fusion of less than about 80 J/g, a melting point of about 105° C. or less, and a crystallinity of about 2% to about 65% of the crystallinity of isotactic polypropylene, and a fractional melt flow rate of about 0.5 to about 20 g/min.

In preferred embodiments, the comonomer is ethylene, butene, 1-hexene, or 1-octene, with ethylene being most preferred. In an embodiment, one or more comonomers is present in the propylene-based elastomer. In embodiments where the propylene-based elastomer comprises ethylene-derived units, the propylene-based elastomer may comprise about 3 wt % to about 25 wt %, or about 5 wt % to about 20 wt %, or about 9 wt % to about 18 wt % of ethylene-derived units. In some embodiments, the propylene-based elastomer consists essentially of units derived from propylene and ethylene, i.e., the propylene-based elastomer does not contain any other comonomer in an amount other than that typically present as impurities in the ethylene and/or propylene feedstreams used during polymerization, or in an amount that would materially affect the heat of fusion, melting point, crystallinity, or fractional melt flow rate of the propylene-based elastomer, or in an amount such that any other comonomer is intentionally added to the polymerization process.

In some embodiments, the propylene-based elastomer may comprise more than one comonomer. Preferred embodiments of a propylene-based elastomer having more than one comonomer include propylene-ethylene-octene, propylene-ethylene-hexene, and propylene-ethylene-butene polymers. In embodiments where more than one comonomer derived from at least one of ethylene or a $C_4$-$C_{10}$ alpha-olefin is present, the amount of one comonomer may be less than about 5 wt % of the propylene-based elastomer, but the combined amount of comonomers of the propylene-based elastomer is about 5 wt % or greater.

The propylene-based elastomer may have a triad tacticity of three propylene units, as measured by $^{13}$C NMR, of at least about 75%, at least about 80%, at least about 82%, at least about 85%, or at least about 90%. Preferably, the propylene-based elastomer has a triad tacticity of about 50 to about 99%, or about 60 to about 99%, or about 75 to about 99%, or about 80 to about 99%. In some embodiments, the propylene-based elastomer may have a triad tacticity of about 60 to 97%.

The propylene-based elastomer has a heat of fusion ("$H_f$"), as determined by DSC, of about 80 J/g or less, or about 70 J/g or less, or about 50 J/g or less, or about 40 J/g or less. The propylene-based elastomer may have a lower limit $H_f$ of about 0.5 J/g, or about 1 J/g, or about 5 J/g. For example, the $H_f$ value may range from a lower limit of about 1.0, 1.5, 3.0, 4.0, 6.0, or 7.0 J/g, to an upper limit of about 35, 40, 50, 60, 70, 75, or 80 J/g.

The propylene-based elastomer may have a percent crystallinity, as determined according to the DSC procedure described herein, of about 2 to about 65%, or about 0.5 to about 40%, or about 1 to about 30%, or about 5 to about 35%, of the crystallinity of isotactic polypropylene. The thermal energy for the highest order of propylene (i.e., 100% crystallinity) is estimated at 189 J/g. In some embodiments, the copolymer has crystallinity less than 40%, or in the range of about 0.25 to about 25%, or in the range of about 0.5 to about 22%, of the crystallinity of isotactic polypropylene.

Embodiments of the propylene-based elastomer may have a tacticity index m/r from a lower limit of about 4, or about 6, to an upper limit of about 8, or about 10, or about 12. In some embodiments, the propylene-based elastomer has an isotacticity index greater than 0%, or within the range having an upper limit of about 50%, or about 25%, and a lower limit of about 3%, or about 10%.

In some embodiments, the propylene-based elastomer may further comprise diene-derived units (as used herein, "diene"). The optional diene may be any hydrocarbon structure having at least two unsaturated bonds wherein at least one of the unsaturated bonds is readily incorporated into a polymer. For example, the optional diene may be selected from straight chain acyclic olefins, such as 1,4-hexadiene and 1,6-octadiene; branched chain acyclic olefins, such as 5-methyl-1,4-hexadiene, 3,7-dimethyl-1,6-octadiene, and 3,7-dimethyl-1,7-octadiene; single ring alicyclic olefins, such as 1,4-cyclohexadiene, 1,5-cyclooctadiene, and 1,7-cyclododecadiene; multi-ring alicyclic fused and bridged ring olefins, such as tetrahydroindene, norbornadiene, methyl-tetrahydroindene, dicyclopentadiene, bicyclo-(2.2.1)-hepta-2,5-diene, norbornadiene, alkenyl norbornenes, alkylidene norbornenes, e.g., ethylidiene norbornene ("ENB"), cycloalkenyl norbornenes, and cycloalkylene norbornenes (such as 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, 5-vinyl-2-norbornene); and cycloalkenyl-substituted alkenes, such as vinyl cyclohexene, allyl cyclohexene, vinyl cyclooctene, 4-vinyl cyclohexene, allyl cyclodecene, vinyl cyclododecene, and tetracyclo (A-11,12)-5,8-dodecene. The amount of diene-derived units present in the propylene-based elastomer may range from an upper limit of about 15%, about 10%, about 7%, about 5%, about 4.5%, about 3%, about 2.5%, or about 1.5%, to a lower limit of about 0%, about 0.1%, about 0.2%, about 0.3%, about 0.5%, about 1%, about 3%, or about 5%, based on the total weight of the propylene-based elastomer.

The propylene-based elastomer may have a single peak melting transition as determined by DSC. In some embodiments, the copolymer has a primary peak transition of about 90° C. or less, with a broad end-of-melt transition of about 110° C. or greater. The peak "melting point" ("$T_m$") is defined as the temperature of the greatest heat absorption within the range of melting of the sample. However, the copolymer may show secondary melting peaks adjacent to the principal peak, and/or at the end-of-melt transition. For the purposes of this disclosure, such secondary melting peaks are considered together as a single melting point, with the highest of these peaks being considered the $T_m$ of the propylene-based elastomer. The propylene-based elastomer may have a $T_m$ of about 110° C. or less, about 105° C. or less, about 100° C. or less, about 90° C. or less, about 80° C. or less, or about 70° C. or less. In some embodiments, the propylene-based elastomer has a $T_m$ of about 25 to about 110° C., or about 40 to about 105° C., or about 60 to about 105° C. $T_m$ of the propylene-based elastomer can be determined by ASTM D3418-03 with a 10° C./min heating/cooling rate.

The propylene-based elastomer may have a density of about 0.850 to about 0.900 g/cm$^3$, or about 0.860 to about 0.880 g/cm$^3$, at room temperature as measured based on ASTM D1505.

The propylene-based elastomer may have a fractional melt flow rate, as measured based on ASTM D1238, 2.16 kg at 230° C., of at least about 0.3 g/10 min. In some embodiments, the propylene-based elastomer may have a fractional melt flow rate of about 0.5 to about 20 g/10 min, or about 2 to about 18 g/10 min.

The propylene-based elastomer may have an Elongation at Break of less than about 2000%, less than about 1800%, less than about 1500%, or less than about 1000%, as measured based on ASTM D638.

In some embodiments, the propylene-based elastomer is an elastomer including propylene-crystallinity, a melting point by DSC equal to or less than 105° C., and a heat of fusion of from about 5 J/g to about 45 J/g. The propylene-derived units are present in an amount of about 80 to about 90 wt %, based on the total weight of the propylene-based elastomer. The ethylene-derived units are present in an amount of about 8 to about 18 wt %, for example, about 8, about 8.5, about 9, about 9.5, about 10, about 10.5, about 11, about 11.5, about 12, about 12.5, about 13, about 13.5, about 14, about 14.5, about 15, about 15.5, about 16, about 16.5, about 17, about 17.5, about 18 wt %, based on the total weight of the propylene-based elastomer.

The compositions disclosed herein may include one or more different propylene-based elastomers, i.e., propylene-based elastomers each having one or more different properties such as, for example, different comonomer or comonomer content. Such combinations of various propylene-based elastomers are all within the scope of the invention.

Suitable propylene-based elastomers may be available commercially under the trade names VISTAMAXX™ (ExxonMobil Chemical Company, Houston, Tex., USA), VERSIFY™ (The Dow Chemical Company, Midland, Mich., USA), certain grades of TAFMER™ XM or NOTIO™ (Mitsui Company, Japan), and certain grades of SOFTEL™ (Basell Polyolefins, Netherlands). The particular grade(s) of commercially available propylene-based elastomer suitable for use in the invention can be readily determined using methods commonly known in the art.

Ethylene Polymers

In one aspect of the invention, the ethylene polymers are selected from ethylene homopolymers, ethylene copolymers, and compositions thereof. Useful copolymers comprise one or more comonomers in addition to ethylene and can be a random copolymer, a statistical copolymer, a block copolymer, and/or compositions thereof. The method of making the polyethylene is not critical, as it can be made by slurry, solution, gas phase, high pressure or other suitable processes, and by using catalyst systems appropriate for the polymerization of polyethylenes, such as Ziegler-Natta-type catalysts, chromium catalysts, metallocene-type catalysts, other appropriate catalyst systems or combinations thereof, or by free-radical polymerization. In a preferred embodiment, the ethylene polymers are made by the catalysts, activators and processes described in U.S. Pat. Nos. 6,342,566; 6,384,142; 5,741,563; and PCT Publication Nos. WO 03/040201; and WO 97/19991. Such catalysts are well known in the art, and are described in, for example, ZIEGLER CATALYSTS (Gerhard Fink, Rolf Mülhaupt and Hans H. Brintzinger, eds., Springer-Verlag 1995); Resconi et al.; and I, II METALLOCENE-BASED POLYOLEFINS (Wiley & Sons 2000). In one aspect of the invention, ethylene polymers may be selected from those that are not prepared using catalyst systems, for example low density polyethylene that is prepared using a peroxide initiator mechanism.

Ethylene polymers and copolymers that are useful in this invention include those sold by ExxonMobil Chemical Company in Houston Tex., including HDPE, LLDPE, and LDPE; and those sold under the ENABLE™, EXACT™, EXCEED™, EXCEED™ XP, ESCORENE™, EXXCO™, ESCOR™, PAXON™, LD, and OPTEMA™ tradenames.

Preferred ethylene homopolymers and copolymers useful in this invention typically have:

1. an $M_w$ of 20,000 g/mol or more, 20,000 to 2,000,000 g/mol, preferably 30,000 to 1,000,000, preferably 40,000 to 200,000, preferably 50,000 to 750,000, as measured by size exclusion chromatography; and/or 2. an $M_w/M_n$ of 1 to 40, preferably 1.6 to 20, or 8 to 25, more preferably 1.8 to 10, more preferably 1.8 to 4, as measured by size exclusion chromatography; and/or 3. a $T_m$ of 30° C. to 150° C., preferably 30° C. to 140° C., preferably 50° C. to 140° C., more preferably 60° C. to 135° C., as determined based on ASTM D3418-03; and/or 4. a crystallinity of 5% to 80%, preferably 10% to 70%, more preferably 20% to 60%, preferably at least 30%, or at least 40%, or at least 50%, as determined based on ASTM D3418-03; and/or 5. a heat of fusion of 300 J/g or less, preferably 1 to 260 J/g, preferably 5 to 240 J/g, preferably 10 to 200 J/g, as determined based on ASTM D3418-03; and/or 6. a crystallization temperature ($T_c$) of 15° C. to 130° C., preferably 20° C. to 120° C., more preferably 25° C. to 110° C., preferably 60° C. to 125° C., as determined based on ASTM D3418-03; and/or 7. a heat deflection temperature of 30° C. to 120° C., preferably 40° C. to 100° C., more preferably 50° C. to 80° C. as measured based on ASTM D648 on injection molded flexure bars, at 66 psi load (455 kPa); and/or 8. a Shore hardness (D scale) of 10 or more, preferably 20 or more, preferably 30 or more, preferably 40 or more, preferably 100 or less, preferably from 25 to 75 (as measured based on ASTM D 2240); and/or 9. a percent amorphous content of at least 20%, preferably at least 50%, preferably at least 60%, more preferably between 50% and 95%, or 70% or less, preferably 60% or less, preferably 50% or less as determined by subtracting the percent crystallinity from 100; and/or 10. a branching index (g'vis) of 0.97 or more, preferably 0.98 or more, preferably 0.99 or more, preferably 1; and/or 11. a density of about 0.860 to about 0.980 g/cm³ (preferably from 0.880 to 0.965 g/cm³, preferably from 0.910 to 0.962 g/cm³, preferably from 0.915 to 0.961 g/cm³) determined based on ASTM D 1505 using a density-gradient column on a compression-molded specimen that has been slowly cooled to room temperature (i.e. over a period of 10 minutes or more) and allowed to age for a sufficient time that the density is constant within +/−0.001 g/cm³.

The polyethylene may be an ethylene homopolymer, such as HDPE. In one embodiment, the ethylene homopolymer has a molecular weight distribution ($M_w/M_n$) of up to 40, preferably ranging from 1.5 to 20, or from 1.8 to 10, or from 1.9 to 5, or from 2.0 to 4. In another embodiment, the 1% secant flexural modulus (determined based on ASTM D790A, where test specimen geometry is as specified under the ASTM D790 section "Molding Materials (Thermoplastics and Thermosets)," and the support span is 2 inches (5.08 cm)) of the ethylene polymer falls in a range of 200 to 1000 MPa, and from 300 to 800 MPa in another embodiment, and from 400 to 750 MPa in yet another embodiment, wherein a desirable polymer may exhibit any combination of any upper flexural modulus limit with any lower flexural modulus limit. The melt index (MI) of preferred ethylene homopolymers range from 0.05 to 800 dg/min in one embodiment, and from 0.1 to 100 dg/min in another embodiment, as measured based on ASTM D1238 (190° C., 2.16 kg).

In a preferred embodiment, the polyethylene comprises less than 20 mol % propylene units (preferably less than 15 mol %, preferably less than 10 mol %, preferably less than 5 mol %, and preferably 0 mol % propylene units).

In another embodiment of the invention, the ethylene polymer useful herein is produced by polymerization of ethylene and, optionally, an alpha-olefin with a catalyst having, as a transition metal component, a bis(n-$C_{3-4}$ alkyl cyclopentadienyl) hafnium compound, wherein the transition metal component preferably comprises from about 95 mol % to about 99 mol % of the hafnium compound as further described in U.S. Pat. No. 9,956,088.

In another embodiment of the invention, the ethylene polymer is an ethylene copolymer, either random or block, of ethylene and one or more comonomers selected from $C_3$ to $C_{20}$ α-olefins, typically from $C_3$ to $C_{10}$ α-olefins. Preferably, the comonomers are present from 0.1 wt % to 50 wt % of the copolymer in one embodiment, and from 0.5 wt % to 30 wt % in another embodiment, and from 1 wt % to 15 wt % in yet another embodiment, and from 0.1 wt % to 5 wt % in yet another embodiment, wherein a desirable copolymer comprises ethylene and $C_3$ to $C_{20}$ α-olefin derived units in any combination of any upper wt % limit with any lower wt % limit described herein. Preferably, the ethylene copolymer will have a weight average molecular weight of from greater than 8,000 g/mol in one embodiment, and greater than 10,000 g/mol in another embodiment, and greater than 12,000 g/mol in yet another embodiment, and greater than 20,000 g/mol in yet another embodiment, and less than 1,000,000 g/mol in yet another embodiment, and less than 800,000 g/mol in yet another embodiment, wherein a desirable copolymer may comprise any upper molecular weight limit with any lower molecular weight limit described herein.

In another embodiment, the ethylene copolymer comprises ethylene and one or more other monomers selected from the group consisting of $C_3$ to $C_{20}$ linear, branched or cyclic monomers, and in some embodiments is a $C_3$ to $C_{12}$ linear or branched alpha-olefin, preferably butene, pentene, hexene, heptene, octene, nonene, decene, dodecene, 4-methyl-pentene-1,3-methyl pentene-1,3,5,5-trimethyl-hexene-1, and the like. The monomers may be present at up to 50 wt %, preferably from 0 wt % to 40 wt %, more preferably from 0.5 wt % to 30 wt %, more preferably from 2 wt % to 30 wt %, more preferably from 5 wt % to 20 wt %, based on the total weight of the ethylene copolymer.

Preferred linear alpha-olefins useful as comonomers for the ethylene copolymers useful in this invention include $C_3$ to $C_8$ alpha-olefins, more preferably 1-butene, 1-hexene, and 1-octene, even more preferably 1-hexene. Preferred branched alpha-olefins include 4-methyl-1-pentene, 3-methyl-1-pentene, 3,5,5-trimethyl-1-hexene, and 5-ethyl-1-nonene. Preferred aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$ to $C_{10}$ alkyl groups. Additionally, two adjacent substitutions may be joined to form a ring structure. Preferred aromatic-group-containing monomers contain at least one aromatic structure appended to a polymerizable olefinic moiety. Particularly, preferred aromatic monomers include styrene, alpha-methylstyrene, para-alkyl-styrenes, vinyltoluenes, vinylnaphthalene, allyl benzene, and indene, especially styrene, paramethyl styrene, 4-phenyl-1-butene and allyl benzene.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene, or higher ring containing diolefins with or without substituents at various ring positions.

In a preferred embodiment, one or more dienes are present in the ethylene polymer at up to 10 wt %, preferably at 0.00001 wt % to 2 wt %, preferably 0.002 wt % to 1 wt %, even more preferably 0.003 wt % to 0.5 wt %, based upon the total weight of the ethylene polymer. In some embodiments diene is added to the polymerization in an amount of from an upper limit of 500 ppm, 400 ppm, or 300 ppm to a lower limit of 50 ppm, 100 ppm, or 150 ppm.

In a preferred embodiment, ethylene copolymers useful herein are preferably a copolymer comprising at least 50 wt % ethylene and having up to 50 wt %, preferably 1 wt % to 35 wt %, even more preferably 1 wt % to 6 wt % of a $C_3$ to $C_{20}$ comonomer, preferably a $C_4$ to $C_8$ comonomer, preferably hexene or octene, based upon the weight of the copolymer. The polyethylene copolymers preferably have a composition distribution breadth index (CDBI) of 60% or more, preferably 60% to 80%, preferably 65% to 80%. In another preferred embodiment, the ethylene copolymers have a CDBI of 60% to 80%, preferably between 65% and 80%. Preferably these polymers are metallocene polyethylenes (mPEs).

In another embodiment, ethylene homopolymers may be suitable for the invention.

Useful mPE homopolymers or copolymers may be produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. Several commercial products produced with such catalyst/activator combinations are commercially available from ExxonMobil Chemical Company in Baytown, Tex. under the tradenames EXCEED™ Polyethylene, EXCEED™ XP, or ENABLE™ Polyethylene.

In one embodiment, the 1% secant flexural modulus of preferred ethylene polymers ranges from 5 MPa to 1000 MPa, preferably from 100 MPa to 800 MPa in another embodiment, and from 10 MPa to 300 MPa in yet another embodiment, wherein a desirable polymer may exhibit any combination of any upper flexural modulus limit with any lower flexural modulus limit.

The crystallinity of the polymer may also be expressed in terms of crystallinity percent. The thermal energy for the highest order of polyethylene is estimated at 290 J/g. That is, 100% crystallinity is equal to 290 J/g. Preferably, the polymer has a crystallinity (as determined by DSC) within the range having an upper limit of 80%, 60%, 40%, 30%, or 20%, and a lower limit of 1%, 3%, 5%, 8%, or 10%. Alternately, the polymer has a crystallinity of 5% to 80%, preferably 10% to 70, more preferably 20% to 60%. Alternatively the polyethylene may have a crystallinity of at least 30%, preferably at least 40%, alternatively at least 50%, where crystallinity is determined.

The level of crystallinity may be reflected in the melting point. In one embodiment of the present invention, the ethylene polymer has a single melting point. Typically, a sample of ethylene copolymer will show secondary melting peaks adjacent to the principal peak, which is considered together as a single melting point. The highest of these peaks is considered the melting point. The polymer preferably has a melting point (as determined by DSC) ranging from an upper limit of 150° C., 130° C. or 120° C. to a lower limit of 35° C., 40° C., or 45° C.

In particular, the ethylene polymer compositions described herein present in at least one outer layer may be physical blends or in situ blends of more than one type of ethylene polymer or compositions of ethylene polymers with polymers other than ethylene polymers where the ethylene polymer component is the majority component, e.g. greater than 50 wt % of the total weight of the composition. Preferably, the average density of the at least one outer layer ranges from about 0.918 g/cm³ to about 0.927 g/cm³, or from about 0.919 g/cm³ to about 0.925 g/cm³. Preferably, the ethylene polymer composition is a blend of two polyethylenes with different densities. In another embodiment, the ethylene polymer composition is a blend of two polyethylene polymers having the same densities. The weight ratio between the polyethylene of a higher density and the polyethylene of a lower density may be about 1:2 to about 1:5, for example, about 1:2, about 1:2.5, about 1:3, about 1:3.5, about 1:4, about 1:4.5, or about 1:5.

In a preferred embodiment, the multilayer film made by the inventive method described herein comprises at least one inner layer between each outer layer and the core layer. The multilayer film can also comprise in at least one inner layer an ethylene polymer composition described herein, preferably in the form of a blend of two polyethylenes. Preferably, at least one inner layer has a density higher than that of the outer layer.

Additives

The film made by the method of the present invention may also contain various additives as is generally known in the art. The additives may be added as a masterbatch or may be present in the polymer. Examples of such additives include an antioxidant, an ultraviolet light stabilizer, a thermal stabilizer, a slip agent, an antiblock (such as POLYBATCH™ F15 antiblock commercially available from A. Schulman in Ohio), a pigment, a processing aid, a cross-linking catalyst, a flame retardant, a filler and a foaming agent, etc. In a preferred embodiment, the additives may each individually present at 0.01 wt % to 50 wt %, or from 0.01 wt % to 10 wt %, or from 0.1 wt % to 6 wt %, based upon the weight of the film.

Film Extrusion Processes

The inventive film may be prepared by cast or blown film extrusion methods known in the art. In blown film extrusion, the film may be pulled upwards by, for example, pinch rollers after exiting from the die and is simultaneously inflated and stretched transversely sideways to an extent that can be quantified by the blow up ratio (BUR). The inflation provides the transverse direction (TD) stretch, while the upwards pull by the pinch rollers provides a machine direction (MD) stretch. As the polymer cools after exiting the die and inflation, it crystallizes and a point is reached where crystallization in the film is sufficient to prevent further MD or TD orientation. The location at which further MD or TD orientation stops is generally referred to as the "frost line" because of the development of haze at that location.

Variables in this process that determine the ultimate film properties include the die gap, the BUR and TD stretch, the take up speed and MD stretch and the frost line height. Certain factors tend to limit production speed and are largely determined by the polymer rheology including the shear sensitivity which determines the maximum output and the melt tension which limits the bubble stability, BUR and take up speed. In cast film extrusion, methods generally used in the art may be used.

Film Structures

The film made as described herein may have an A/B/C/D/E structure wherein D is the subskin layer and E is the skin layer. Only the subskin D and the skin E layers are altered in the inventive examples of the invention, as compared to the reference films. In an embodiment, layer B is the same as layer A. In another embodiment, layer B is different from layer A.

The thickness of the films may range from about 5 to about 200 μm in general and is largely determined by the intended use and properties of the film. Conveniently the film has a thickness of from about 5 to about 200 μm, preferably from about 10 to about 150 μm, and more preferably from 20 to 80 μm. The thickness of each layer of the film is less than about 100 μm, preferably from 1 to 30 μm.

The films prepared according to the present invention may be used in flexible food packaging applications, e.g., to pack fresh and processed meat, matured and no-matured cheese, fresh fish, vegetables, bag in box applications. A package comprising a film prepared by the method described herein can be heat sealed around package content. Flexible packaging for food generally includes a barrier layer of polyamide (PA) or ethylene vinyl alcohol (EVOH) or a PA/EVOH blend. In an embodiment, the flexible food packaging film according to the invention is a 7 layer film with a soft sub skin layer having a PA and tie layers in the middle and having two polyethylene layers on the skins and sub skin layers. Such a film can be 5 layers, 7 layers, 9 layers, or 11 layers.

Examples

The present invention, while not meant to be limited by, may be better understood by reference to the following examples and tables.

Exceed™ 1012HA mVLDPE is a metallocene-catalyzed ethylene-hexene copolymer, commercially available from ExxonMobil Chemical Company, having a density of 0.912 g/cm$^3$, melt index (190° C., 2.16 kg) of 1.0 g/10 min, and a peak melting temperature of 115° C. Exceed™ 1018HA is a metallocene ethylene-hexene copolymer, commercially available from ExxonMobil Chemical Company, having a density of 0.918 g/cm$^3$, melt index (190° C., 2.16 kg) of 1.0 g/10 min, and a peak melting temperature of 118° C. Enable™ 20-05 is a metallocene-catalyzed ethylene-hexene copolymer, commercially available from ExxonMobil Chemical Company, having a density of 0.920 g/cm$^3$, melt index (190° C., 2.16 kg) of 0.5 g/10 min, and a peak melting temperature of 114° C. HTA 108 is a homopolymer high density polyethylene film grade resin, commercially available from ExxonMobil Chemical Company, having a density of 0.961 g/cm$^3$, melt index (190° C., 2.16 kg) of 0.70 g/10 min, melt flow rate of 46 g/10 min, and softening temperature of 127° C. Vistamaxx™ 6102 performance polymer is a metallocene-catalyzed propylene-ethylene copolymer, commercially available from ExxonMobil Chemical Company, having a density of 0.862 g/cm$^3$, melt index (190° C., 2.16 kg) of 1.4 g/10 min, melt flow rate of 3 g/10 min, and ethylene content of 16 wt %. Vistamaxx™ 3980 performance polymer is a metallocene-catalyzed propylene-ethylene copolymer, commercially available from ExxonMobil Chemical Company, having a density of 0.878 g/cm$^3$, melt index (190° C., 2.16 kg) of 3.7 g/10 min, melt flow rate of 8 g/10 min, and ethylene content of 9 wt %. Vistamaxx™ 3588 performance polymer is a metallocene-catalyzed propylene-ethylene copolymer, commercially available from ExxonMobil Chemical Company, having a density of 0.889 g/cm$^3$, melt flow rate of 8 g/10 min, and ethylene content of 4 wt %. Exact 9601 is an ethylene copolymer plastomer commercially available from ExxonMobil Chemical Company. LD150 is a low density high pressure polyethylene resin, commercially available from ExxonMobil Chemical Company, having a density of 0.923 g/cm$^3$, a melt index (190° C., 2.16 kg) of 0.75 g/10 min, and a peak melting temperature of 110° C. POLYBATCH© CE-505E is a 5% erucamide slip concentrate based in polyethylene, commercially available from A. Schulman. POLYBATCH™ F15 is an antiblock concentrate commercially available from A. Schuman.

Films were produced in a 5 layer co-extrusion blown line with 5 extruders. The films each have a thickness of 50 μm. The film formulations for the inventive and comparative films can be found in the following tables. The layer distribution for the films was either 1/1/6/1/1 or 1/1/6/1.5/0.5, as indicated in Table 1 below. The invention is not limited to the layer distribution exemplified in Table 1. The inventors appreciate that other layer distributions may be selected based on the target film thickness, film properties, and extruder operating conditions. In an embodiment of the invention, the films may be prepared with or without barrier polymer, may be prepared via blown or cast film extrusion processes, and may be prepared with or without water quench. The films were evaluated for various properties, as illustrated in FIG. 1A, FIG. 1B, FIG. 1C, FIG. 1D, FIG. 2A, FIG. 2B, FIG. 2C, FIG. 2D, FIG. 3, FIG. 4A, FIG. 4B, FIG. 5A, FIG. 5B, FIG. 6A, FIG. 6B, FIG. 7A, FIG. 7B, FIG. 8A, and FIG. 8B. The test methods used to measure those properties are provided below.

Hot Tack Force is measured based on ASTM F-1921 to evaluate the strength of sealing. Seal Strength sample preparation is based on ASTM F-2029 to evaluate the strength of the seal upon sealing. Bag Drop Height evaluates the height at which a bag formed from the film breaks. To measure Bag Drop Height, the films were first sealed at the bottom and sides and filled with 1 kg of titanium oxide masterbatch pellets and then sealed at the top. The bag is then dropped at a certain height. Vertical Form Fill Seal Hot Tack evaluates the seal strength during sealing in packaging application. To measure the Vertical Form Fill Seal Hot Tack, the films were sealed at the bottom and sides, filled with 1 kg of masterbatch pellets, and then sealed at the top. The bottom seal was tested by peeling the seal with a hand, varying the seal time and temperature. Rupture strength is a measurement of the seal integrity after packaging. To measure Rupture Strength, the films were sealed at the bottom and sides, and then sealed at the top. Air was injected continuously in the empty bag via a needle and the strength required to rupture the bag was recorded, varying the seal time and temperature. Hermeticity is also a measurement of the seal integrity after packaging. To measure Hermeticity, the films were sealed at the bottom and sides, then sealed at the top. The empty bags were placed in a water tank with 300 and 600 mbar of vacuum pressure and the leakage of the bag was recorded. Seal Through Contamination is also a measurement of the seal integrity during packaging. To measure Seal Through Contamination, the films were sealed at the bottom and sides, and then sealed at the top. During the sealing process, coffee creamer was sprayed on the seal area, prior to closing the seal bars, to create extreme contamination. The films were sealed at 140° C. and 400 msec. The bags with coffee creamer were placed in a water tank with a vacuum pressure and the leakage of the bags was recorded.

Figure 1B:
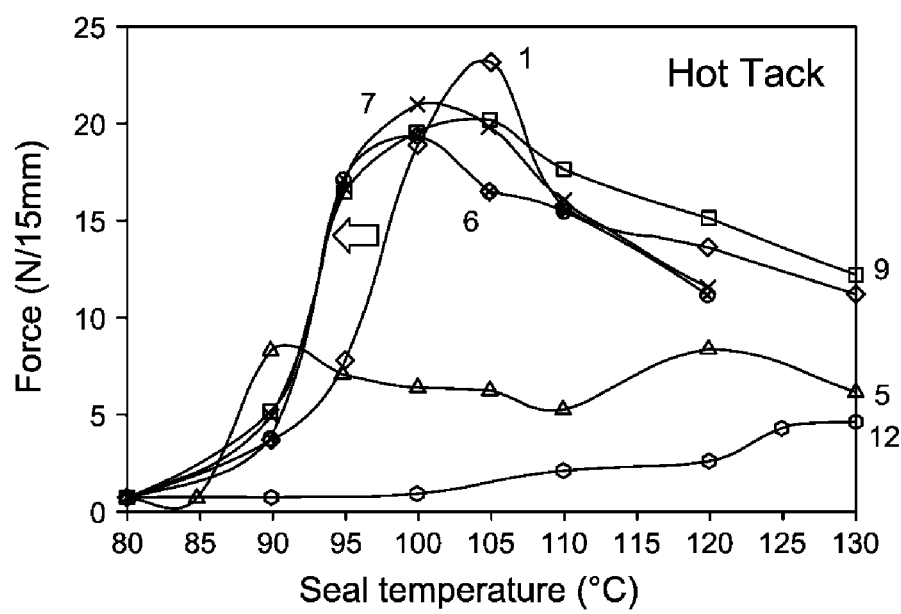
Figure 1C:
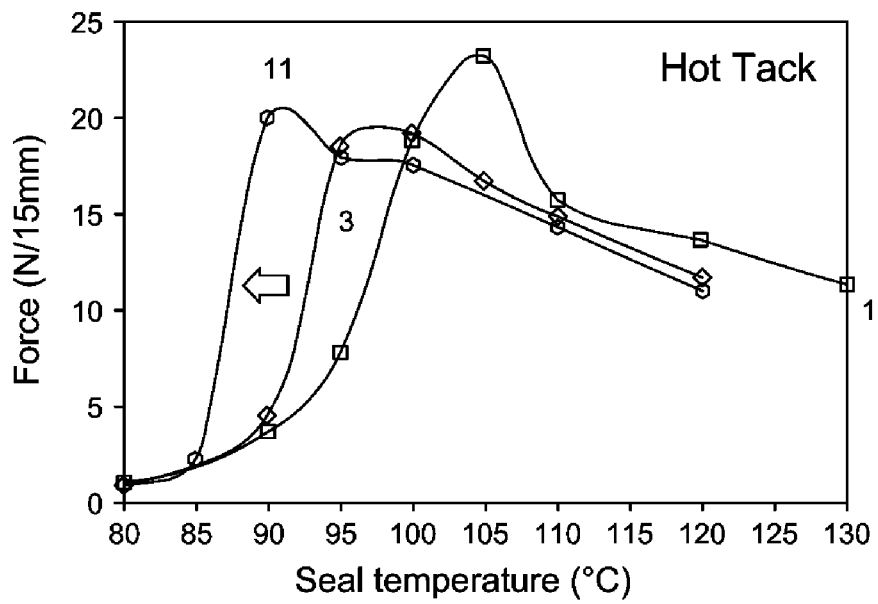
Figure 1D:
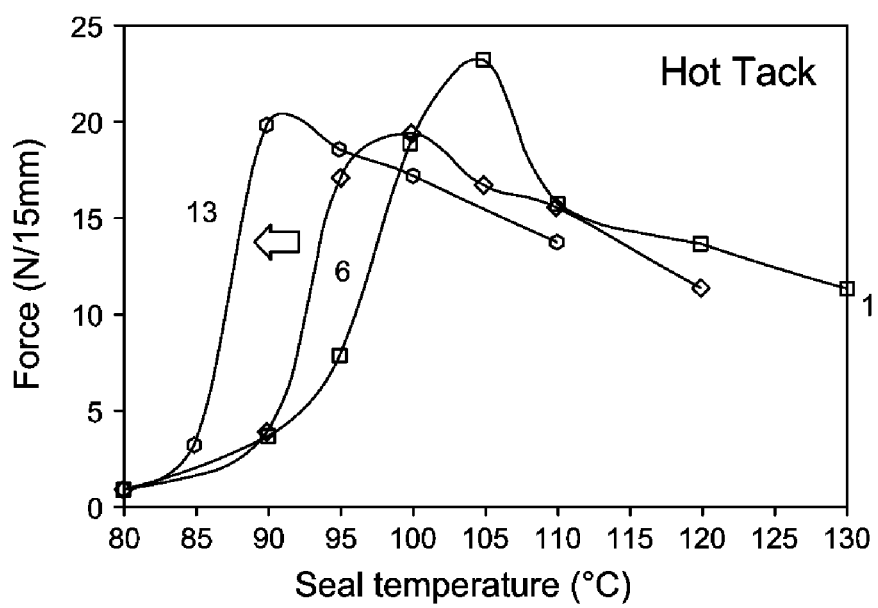

FIG. 1A shows that compared to reference Film 1 (with 100% Exceed 1012 in the skin and subskin layer), films with low crystalline propylene-based elastomer Vistamaxx (Films 4 and 3) or a blend of propylene-based elastomer Vistamaxx and Exceed (Film 8) displayed a broader hot tack window. A broader hot tack range allows for a lower sealing temperature or higher line speed for an equivalent hot tack force, which in turn results in higher output (saving energy and lowering costs). A similar trend is shown in FIG. 1B as was shown in FIG. 1A, indicating that the difference in layer ratios (1/1/6/1.5/0.5 versus 1/1/6/1/1) does not affect the hot tack force of the film. FIG. 1C shows that a blend of Vistamaxx 3588 and 6102 (Film 11) helps broaden hot tack window as compared to a blend of Exceed 1012 and Vistamaxx 6102 (Film 3). A similar trend is shown in FIG. 1D as was shown in FIG. 1C, confirming the difference in layer ratio does not affect the hot tack force of the film.

Figure 2A:
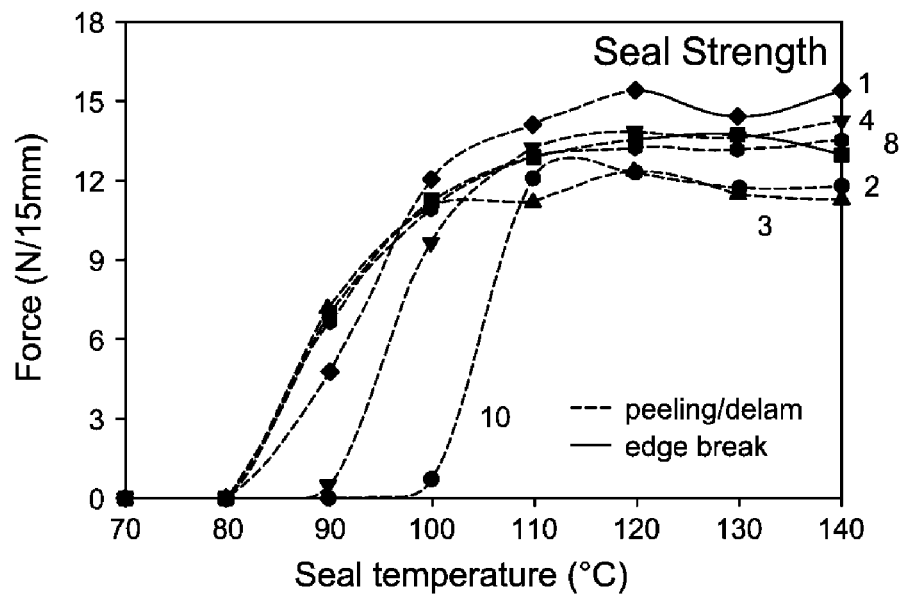
FIG. 2A, FIG. 2B, FIG. 2C, and FIG. 2D depict the seal strength of inventive and comparative films.
Figure 2B:
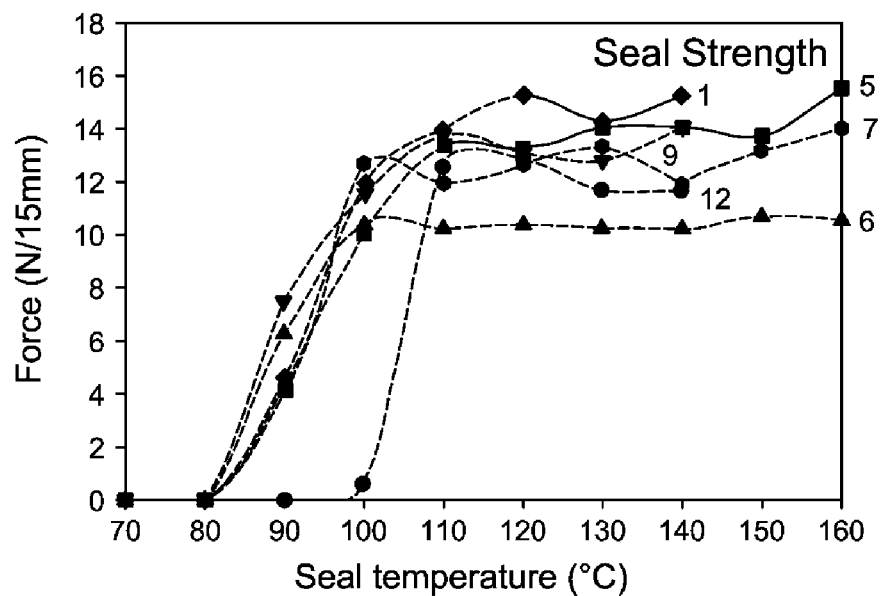
Figure 2C:
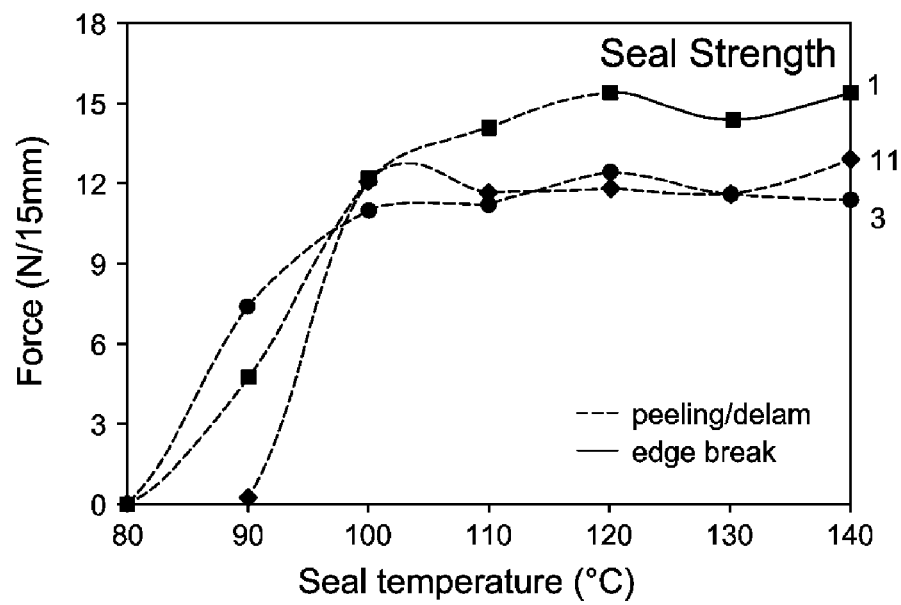
Figure 2D:
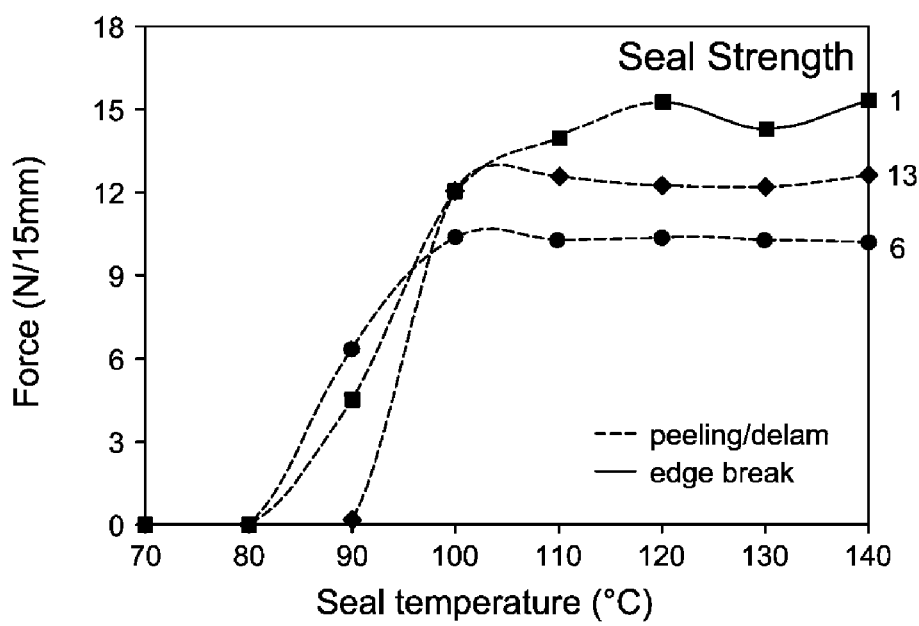

FIG. 2A shows that reference Film 1 (with 100% Exceed in the skin and subskin layer) has a similar sealing profile as compared to films with propylene-based elastomer Vistamaxx (Films 4 and 3), or other ethylene copolymers such as Exact (Films 2 and 10), or a blend of Vistamaxx and Exceed (Film 8) are used in the skin and subskin. FIG. 2B shows a similar trend as FIG. 2A, indicating that the layer ratios do not affect the seal strength of the films. FIG. 2C shows that the film with Vistamaxx 3588 in the skin (Film 11) has as similar seal strength behavior as the reference film with pure Exceed (Film 1) or the film with a blend of Exceed and Vistamaxx (Film 3). FIG. 2C shows a similar trend as FIG. 2D, indicating that the layer ratios do not affect the seal strength of the films.

Figure 3:
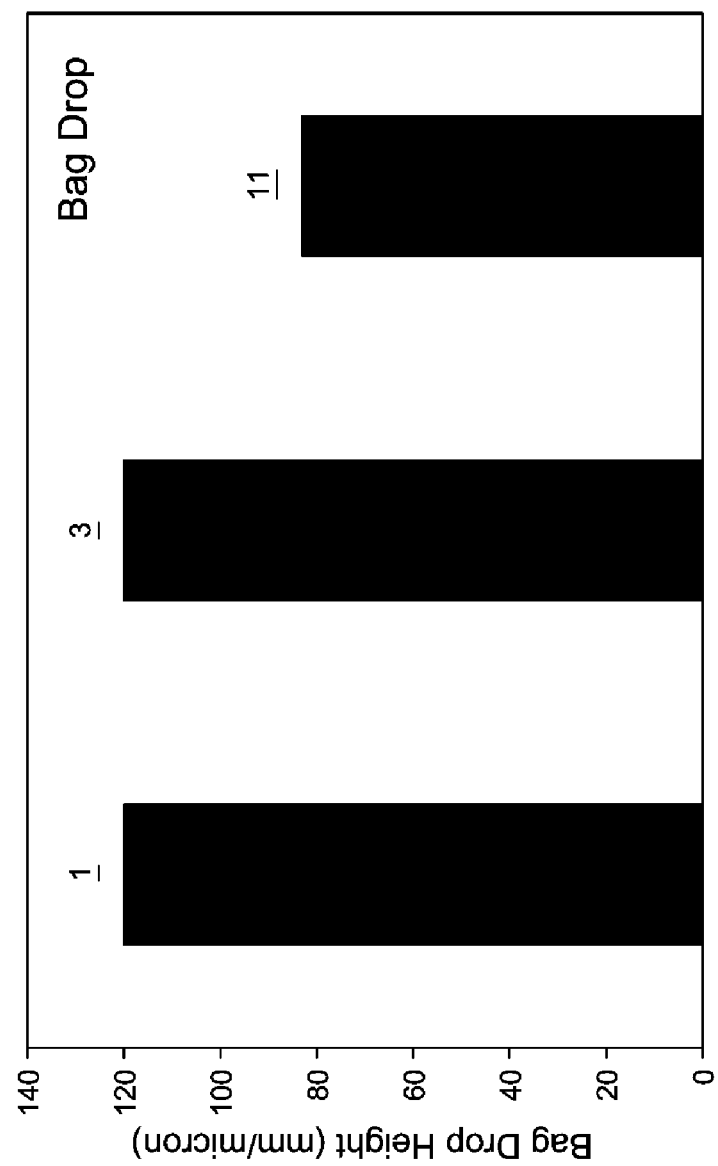
FIG. 3 depicts the bag drop performance of certain inventive and comparative films.

FIG. 3 shows the bag drop performance of reference Film 1 and inventive Film 3 (with a blend of Exceed and Vistamaxx in the skin and subskin layers) and Film 11 (with a blend of Vistamaxx 3588 and 6102 in the skin and subskin layers). Film 11 have inferior bag drop performance (i.e., the bag broke) as compared to performance of Films 1 and 3 which did not break. However, Film 11 still has a qualified bag drop performance, indicating that the overall sealing and packaging properties of Vistamaxx 3588 in the skin layer are suitable for blown films for packaging applications.

FIG. 4A and FIG. 4B depict the vertical form fill seal hot tack test when the base film is laminated to a 12 μm oriented polyester. When the Film has a low crystalline subskin (Films 2 and 3 of FIG. 4A and Films 6 and 13 of FIG. 4B), the film displayed good hot tack strength at a broad seal temperature and time window (and therefore lower sealing temperature and higher line speed in packaging, thereby saving energy by increasing output and lowering costs).

Figure 5A:
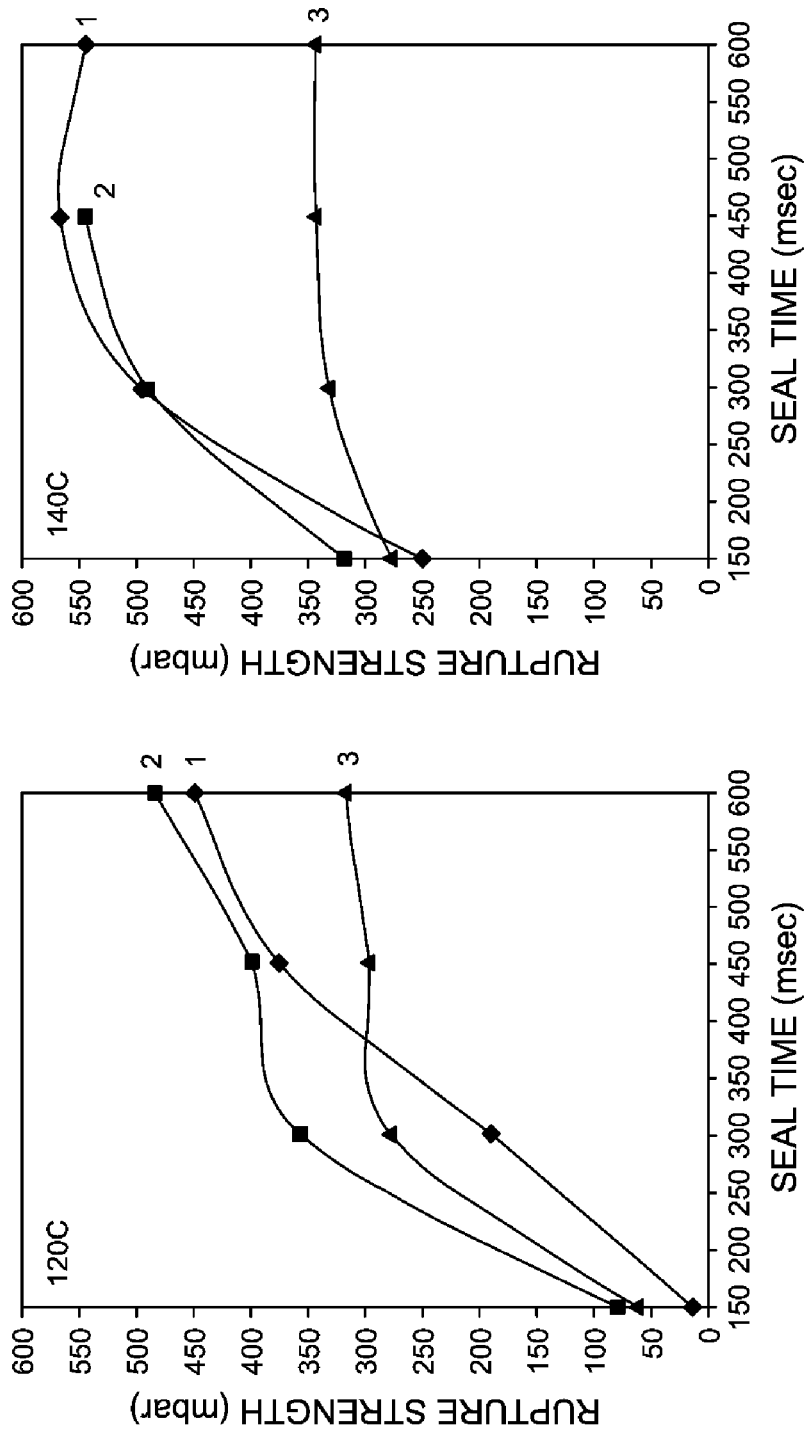
FIG. 5A and FIG. 5B depict the rupture strength of films.
Figure 5B:
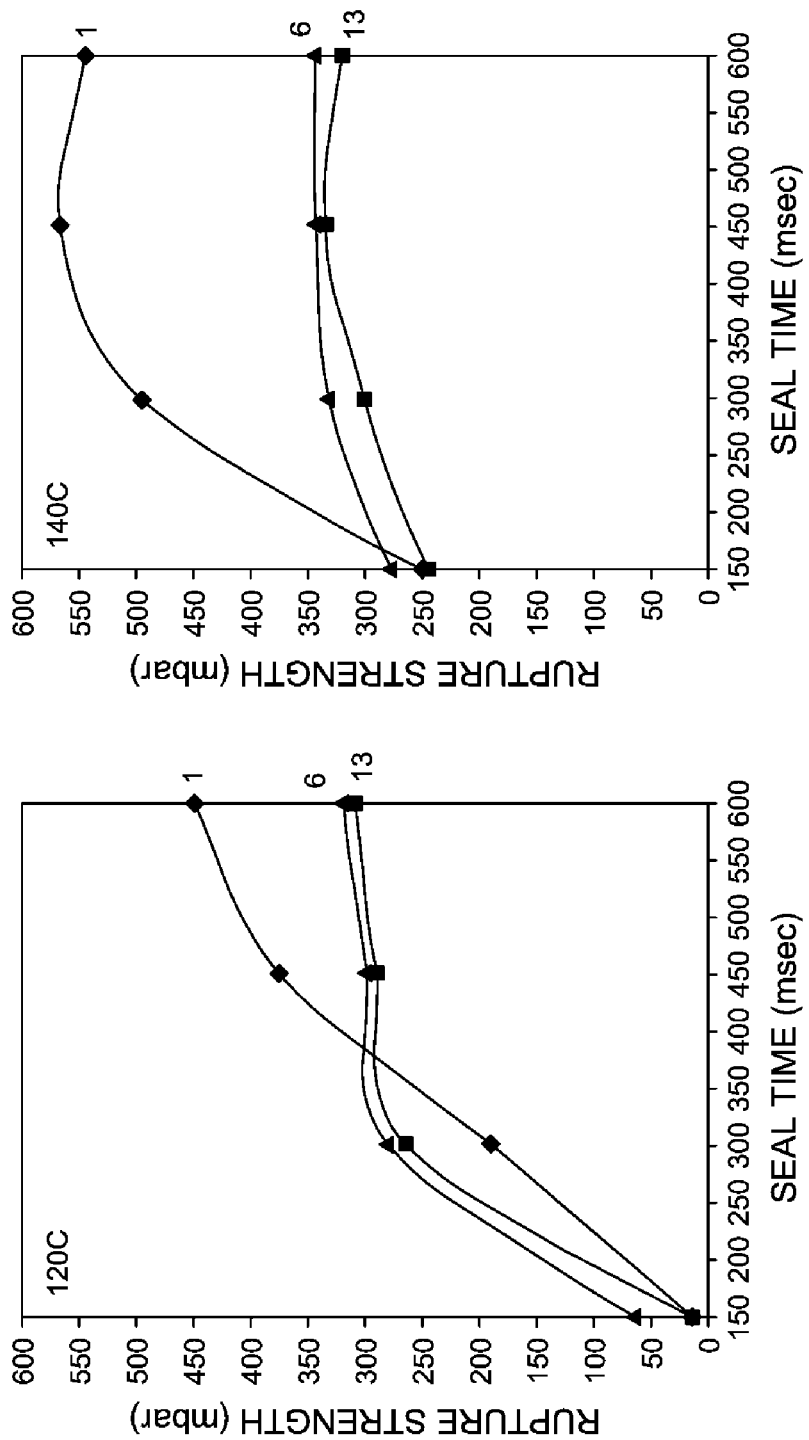

FIG. 5A and FIG. 5B depict the rupture strength over seal time for reference Film 1 and Films 2 and 3 (FIG. 5A) and Films 6 and 13 (FIG. 5B) Films with a low crystalline subskin material in the subskin layer (e.g., Films 2, 3, 6, and 13) reach a plateau rupture strength at a quicker seal time and lower seal temperature (120° C. versus 140° C.), which in turn results in a lower sealing temperature and higher line speed in packaging (thereby saving energy, increasing output, and lowering costs).

FIG. 6A and FIG. 6B indicate the leakage of bags at varying vacuum pressure Films with a low crystalline material in the subskin layer (i.e., Films 2 and 3 of FIG. 6A and Films 6 and 13 of FIG. 6B) showed fewer leaks at broader seal time and temperature ranges, which in turn resulted in lower sealing temperature and higher line speed in packaging.

Figure 7A:
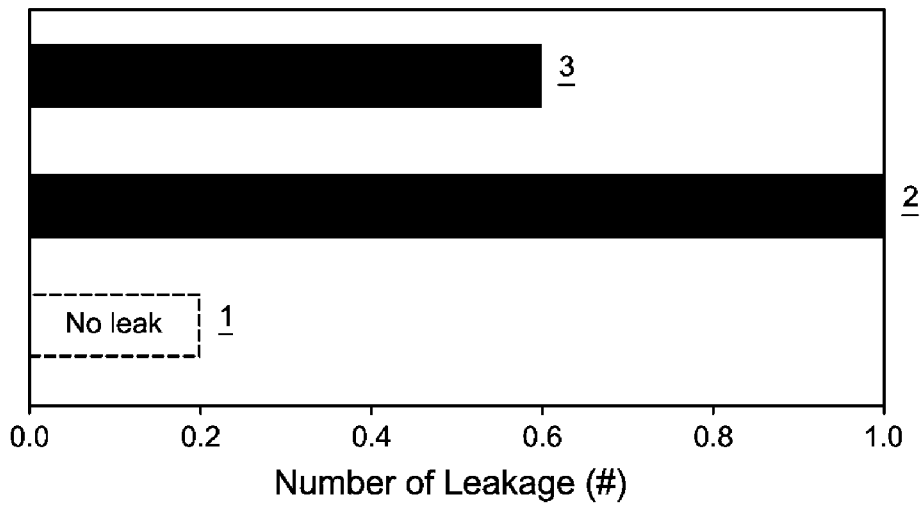
FIG. 7A and FIG. 7B depict the seal through contamination of bags made from films filled with coffee creamer.
Figure 7B:
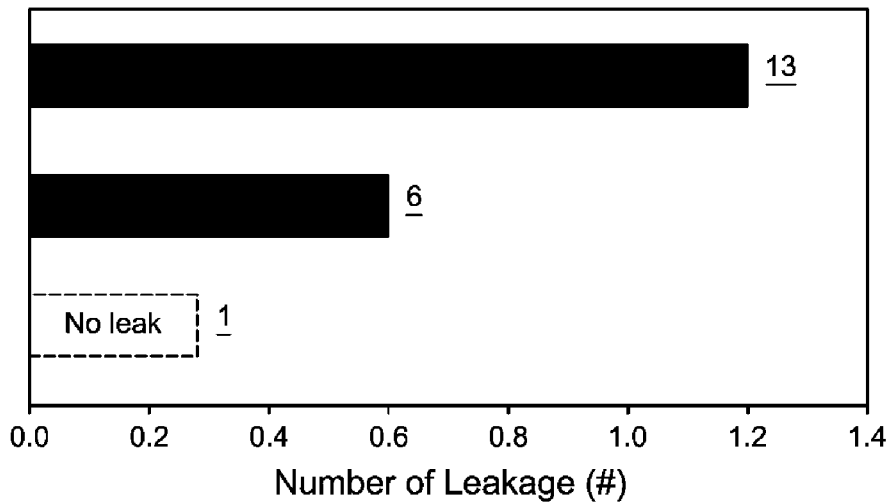

FIG. 7A and FIG. 7B show the seal through contamination of bags with coffee creamer. Films with low crystalline material in the subskin layer (i.e., Films 2 and 3 of FIG. 7A and Films 6 and 13 of FIG. 7B) showed inferior but acceptable seal through contamination as compared to reference Film 1.

Figure 8A:
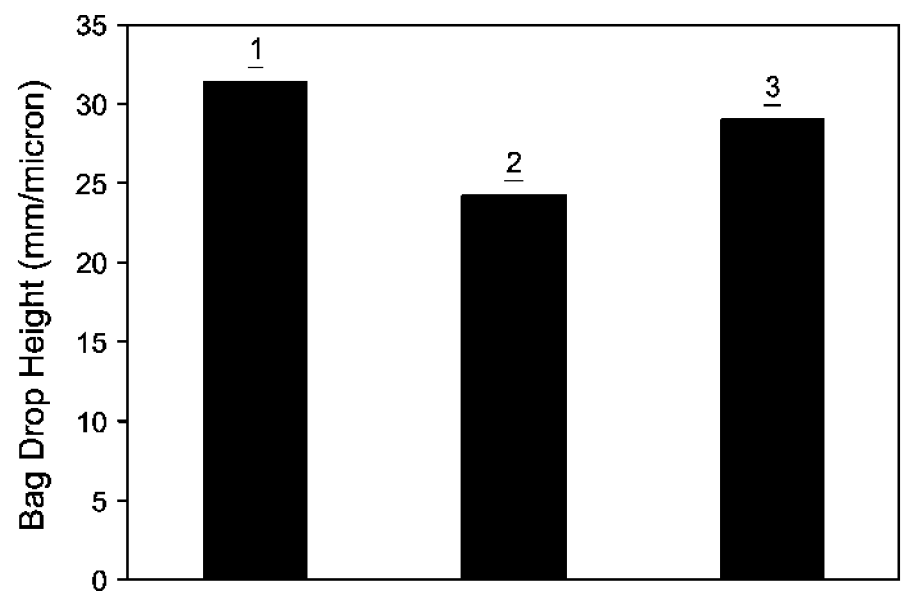
FIG. 8A and FIG. 8B depict additional bag drop performance of certain inventive and comparative films.
Figure 8B:
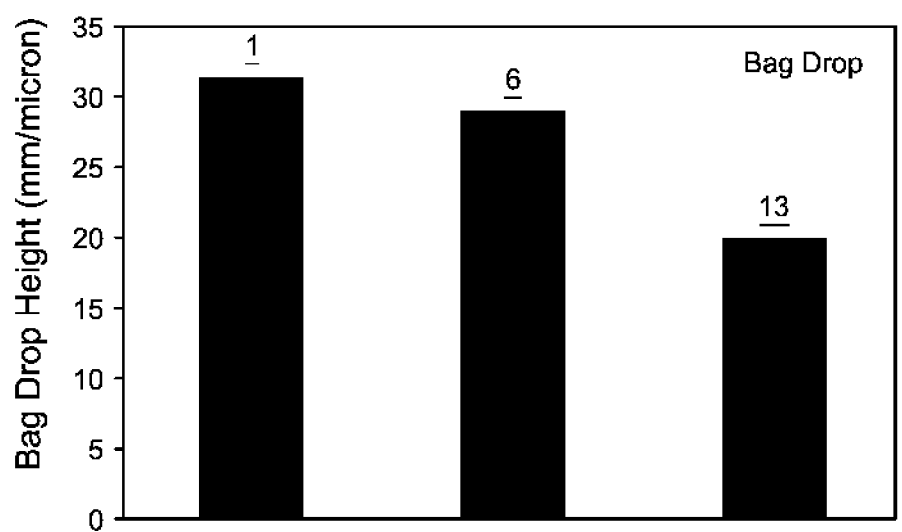

FIG. 8A and FIG. 8B show the bag drop performance of Films 2 and 3 (FIG. 8A) and Films 6 and 13 (FIG. 8B) Films with a low crystalline material in the subskin have similar bag drop performance as compared to reference film—indicating that the overall sealing and packaging properties of films with a low crystallinity subskin towards the sealing layer is suitable for packaging applications.

Overall, use of a low crystalline material in the subskin layer of blown films does not adversely impact the processability and machinability during film blowing and downstream packaging. These films displayed improved sealing and packaging properties at a broader sealing time and temperature window, and therefore a lower sealing temperature and higher packaging line speed.

All documents described herein are incorporated by reference herein, including any priority documents and/or testing procedures. When numerical lower limits and numerical upper limits are listed herein, ranges from any lower limit to any upper limit are contemplated. As is apparent from the foregoing general description and the specific embodiments, while forms of the invention have been illustrated and described, various modifications can be made without departing from the spirit and scope of the invention. Accordingly, it is not intended that the invention be limited thereby.

TABLE 1

Film Formulations

| | Layer Ratio (%) | | Formulations |
|---|---|---|---|
| 1 | 10/10/60/ 10/10 | Layer 1 | 25% Enable 2005HH/75% Exceed 1018HA |
| | | Layer 2 | 25% Enable 2005HH/75% Exceed 1018HA |
| | | Layer 3 | 35% HTA 108/64% Enable 2005HH/1% CE-505E |
| | | Layer 4 | 100% Exceed 1012HA |
| | | Layer 5 | 94% Exceed 1012HA/4% CE-505E/2% F15 antiblock |
| 2 | 10/10/60/ 10/10 | Layer 1 | 25% Enable 2005HH/75% Exceed 1018HA |
| | | Layer 2 | 25% Enable 2005HH/75% Exceed 1018HA |
| | | Layer 3 | 35% HTA 108/64% Enable 2005HH/1% CE-505E |
| | | Layer 4 | 100% Exact 9601 |
| | | Layer 5 | 94% Exceed 1012HA/4% CE-505E/2% F15 antiblock |
| 3 | 10/10/60/ 10/10 | Layer 1 | 25% Enable 2005HH/75% Exceed 1018HA |
| | | Layer 2 | 25% Enable 2005HH/75% Exceed 1018HA |
| | | Layer 3 | 35% HTA 108/64% Enable 2005HH/1% CE- |

TABLE 1-continued

Film Formulations

| | Layer Ratio (%) | | Formulations |
|---|---|---|---|
| | | | 505E |
| | | Layer 4 | 100% Vistamaxx 6102 |
| | | Layer 5 | 94% Exceed 1012HA/4% CE-505E/2% F15 antiblock |
| 4 | 10/10/60/ 10/10 | Layer 1 | 25% Enable 2005HH/75% Exceed 1018HA |
| | | Layer 2 | 25% Enable 2005HH/75% Exceed 1018HA |
| | | Layer 3 | 35% HTA 108/64% Enable 2005HH/1% CE-505E |
| | | Layer 4 | 100% Vistamaxx 3980 |
| | | Layer 5 | 94% Exceed 1012HA/4% CE-505E/2% F15 antiblock |
| 5 | 10/10/60/ 15/5 | Layer 1 | 25% Enable 2005HH/75% Exceed 1018HA |
| | | Layer 2 | 25% Enable 2005HH/75% Exceed 1018HA |
| | | Layer 3 | 35% HTA 108/64% Enable 2005HH/1% CE-505E |
| | | Layer 4 | 100% Exact 9601 |
| | | Layer 5 | 94% Exceed 1012HA/4% CE-505E/2% F15 antiblock |
| 6 | 10/10/60/ 15/5 | Layer 1 | 25% Enable 2005HH/75% Exceed 1018HA |
| | | Layer 2 | 25% Enable 2005HH/75% Exceed 1018HA |
| | | Layer 3 | 35% HTA 108/64% Enable 2005HH/1% CE-505E |
| | | Layer 4 | 100% Vistamaxx 6102 |
| | | Layer 5 | 94% Exceed 1012HA/4% CE-505E/2% F15 antiblock |
| 7 | 10/10/60/ 15/5 | Layer 1 | 25% Enable 2005HH/75% Exceed 1018HA |
| | | Layer 2 | 25% Enable 2005HH/75% Exceed 1018HA |
| | | Layer 3 | 35% HTA 108/64% Enable 2005HH/1% CE-505E |
| | | Layer 4 | 100% Vistamaxx 3980 |
| | | Layer 5 | 94% Exceed 1012HA/4% CE-505E/2% F15 antiblock |
| 8 | 10/10/60/ 10/10 | Layer 1 | 25% Enable 2005HH/75% Exceed 1018HA |
| | | Layer 2 | 25% Enable 2005HH/75% Exceed 1018HA |
| | | Layer 3 | 35% HTA 108/64% Enable 2005HH/1% CE-505E |
| | | Layer 4 | 25% Exceed 1012HA/75% Vistamaxx 6102 |
| | | Layer 5 | 94% Exceed 1012HA/4% CE-505E/2% F15 antiblock |
| 9 | 10/10/60/ 15/5 | Layer 1 | 25% Enable 2005HH/75% Exceed 1018HA |
| | | Layer 2 | 25% Enable 2005HH/75% Exceed 1018HA |
| | | Layer 3 | 35% HTA 108/64% Enable 2005HH/1% CE-505E |
| | | Layer 4 | 25% Exceed 1012HA/75% Vistamaxx 3980 |
| | | Layer 5 | 94% Exceed 1012HA/4% CE-505E/2% F15 antiblock |
| 10 | 10/10/60/ 10/10 | Layer 1 | 25% Enable 2005HH/75% Exceed 1018HA |
| | | Layer 2 | 25% Enable 2005HH/75% Exceed 1018HA |
| | | Layer 3 | 35% HTA 108/64% Enable 2005HH/1% CE-505E |
| | | Layer 4 | 100% Exact 9601 |
| | | Layer 5 | 97% LD 150/2% CE-505E/1% F15 antiblock |
| 11 | 10/10/60/ 10/10 | Layer 1 | 25% Enable 2005HH/75% Exceed 1018HA |
| | | Layer 2 | 25% Enable 2005HH/75% Exceed 1018HA |
| | | Layer 3 | 35% HTA 108/64% Enable 2005HH/1% CE-505E |
| | | Layer 4 | 100% Vistamaxx 6102 |
| | | Layer 5 | 94% Vistamaxx 3588/4% CE-505E/2% F15 antiblock |
| 12 | 10/10/60/ 15/5 | Layer 1 | 25% Enable 2005HH/75% Exceed 1018HA |
| | | Layer 2 | 25% Enable 2005HH/75% Exceed 1018HA |
| | | Layer 3 | 35% HTA 108/64% Enable 2005HH/1% CE-505E |
| | | Layer 4 | 100% Exact 9601 |
| | | Layer 5 | 97% LD 150/2% CE-505E/1% F15 antiblock |
| 13 | 10/10/60/ 15/5 | Layer 1 | 25% Enable 2005HH/75% Exceed 1018HA |
| | | Layer 2 | 25% Enable 2005HH/75% Exceed 1018HA |
| | | Layer 3 | 35% HTA 108/64% Enable 2005HH/1% CE-505E |
| | | Layer 4 | 100% Vistamaxx 6102 |
| | | Layer 5 | 94% Vistamaxx 3588/4% CE-505E/2% F15 antiblock |

What is claimed is:

1. A multilayer film, comprising:
   a. an outer layer comprising about 15 wt % to about 30 wt % of a first ethylene copolymer and about 70 wt % to about 85 wt % of a second ethylene copolymer, where the first and second ethylene copolymer are not the same;
   b. an inner layer, adjacent to the outer layer, wherein the inner layer is the same or different from the outer layer;
   c. a core layer, adjacent to the inner layer, comprising about 20 wt % to about 40 wt % of a polyethylene homopolymer, about 0.5 wt % to about 5 wt % of a slip additive, and about 55 wt % to about 79.5 wt % of a third ethylene copolymer;
   d. a subskin layer, adjacent to the core layer, wherein the subskin layer comprises 100 wt % of a subskin polymer, and wherein the subskin polymer is selected from the group consisting of:
      a first propylene-based elastomer having at least about 60 wt % propylene-derived units and about 16 wt % ethylene-derived units, based on total weight of the first propylene-based elastomer, and a heat of fusion of less than about 80 J/g; and
      an ethylene-butene copolymer; and
   e. a skin layer, adjacent to the subskin layer, wherein the skin layer comprises a skin layer material selected from the group consisting of: a fourth ethylene copolymer and a second propylene-based elastomer, wherein the second propylene-based elastomer is not the same as the first propylene-based elastomer;

and
wherein a melting temperature of the subskin layer is less than a melting temperature of the core layer and a melting temperature of the skin layer.

2. The multilayer film of claim 1, wherein the subskin layer is about 50% to about 200% of the total thickness of the skin layer.

3. The multilayer film of claim 1, wherein the slip additive is erucamide polyethylene.

4. The multilayer film of claim 1, wherein the first ethylene copolymer, the second ethylene copolymer, and the third ethylene copolymer are each ethylene-hexene copolymers.

5. The multilayer film of claim 1, wherein the difference in ethylene content between the first propylene-based elastomer and the second propylene-based elastomer is from about 10 wt % to about 15 wt %.

6. A laminate comprising (a) the multilayer film of claim 1; and (b) a substrate selected from at least one of polyethylene, polypropylene, polyethylene terephthalate, biaxially oriented polypropylene, biaxially oriented polyethylene terephthalate, and combinations thereof.

7. A blown film comprising the multilayer film of claim 1.

8. A multilayer film, comprising:
   (a) an outer layer comprising about 15 wt % to about 30 wt % of a first ethylene copolymer and about 70 wt % to about 85 wt % of a second ethylene copolymer, where the first and second ethylene copolymer are not the same;
   (b) an inner layer, adjacent to the outer layer, wherein the inner layer is the same or different from the outer layer;
   (c) a core layer, adjacent to the inner layer, comprising about 20 wt % to about 40 wt % of a polyethylene homopolymer, about 0.5 wt % to about 5 wt % of a first slip additive, and about 55 wt % to about 79.5 wt % of a third ethylene copolymer;

(d) a subskin layer, adjacent to the core layer, comprising 100 wt % of a first propylene-based elastomer having at least about 60 wt % propylene-derived units and about 15 wt % to about 18 wt % ethylene-derived units, based on total weight of the first propylene-based elastomer, and a heat of fusion of less than about 80 J/g; and (e) a skin layer, adjacent to the subskin layer, comprising about 1 wt % to about 5 wt % of an antiblock, about 2 wt % to about 5 wt % of a second slip additive, and about 90 wt % to about 97 wt % of a skin polymer material;

wherein the skin polymer material of the skin layer is selected from: an ethylene-hexene copolymer and a second propylene-based elastomer, wherein the second propylene-based elastomer comprises about 4 wt % ethylene.

9. The multilayer film of claim 8, wherein the subskin layer is about 50% to about 200% of the total thickness of the skin layer.

10. The multilayer film of claim 8, wherein the first slip additive and the second slip additive are both erucamide polyethylene.

11. The multilayer film of claim 8, wherein the first ethylene copolymer, the second ethylene copolymer, and the third ethylene copolymer are each ethylene-hexene copolymers.

12. The multilayer film of claim 8, wherein the difference in ethylene content between the first propylene-based elastomer and the second propylene-based elastomer is from about 10 wt % to about 15 wt %.

13. A laminate comprising (a) the multilayer film of claim 8; and (b) a substrate selected from at least one of polyethylene, polypropylene, polyethylene terephthalate, biaxially oriented polypropylene, biaxially oriented polyethylene terephthalate, and combinations thereof.

14. The multilayer film of claim 13, wherein the thickness of each layer of the film is between about 1 μm and about 30 μm.

15. A blown film comprising the multilayer film of claim 13.

16. The blown film of claim 13, wherein the core layer is about 40 wt % to about 65 wt % of the multilayer film based on the total weight of the multilayer film.

17. The blown film of claim 13, wherein the subskin layer is about 10 wt % to about 15 wt % of the multilayer film based on the total weight of the multilayer film.

18. The blown film of claim 13, wherein the skin layer is about 5 wt % to about 10 wt % of the multilayer film based on the total weight of the multilayer film.

19. The multilayer film of claim 8, wherein the first propylene-based elastomer has about 16 wt % ethylene-derived units.

20. A multilayer film, comprising:
(a) an outer layer comprising about 15 wt % to about 30 wt % of a first ethylene copolymer and about 70 wt % to about 85 wt % of a second ethylene copolymer, where the first and second ethylene copolymer are not the same;
(b) an inner layer, adjacent to the outer layer, wherein the inner layer is the same as the outer layer;
(c) a core layer, adjacent to the inner layer, comprising about 20 wt % to about 40 wt % of a polyethylene homopolymer, about 0.5 wt % to about 5 wt % of a slip additive, and about 55 wt % to about 79.5 wt % of an ethylene copolymer;
(d) a subskin layer, adjacent to the core layer, comprising 100 wt % of a third ethylene copolymer, wherein the third ethylene copolymer is an ethylene-butene copolymer; and
(e) a skin layer, adjacent to the subskin layer, comprising about 1 wt % to about 5 wt % of an antiblock, about 2 wt % to about 5 wt % of a slip additive, and about 90 wt % to about 97 wt % of a skin polymer material;

wherein the skin polymer material of the skin layer is selected from a fourth ethylene copolymer and a propylene-based elastomer, wherein the propylene-based elastomer has at least about 60 wt % propylene-derived units and about 3 wt % to about 5 wt % ethylene-derived units, based on total weight of the propylene-based elastomer, and a heat of fusion of less than about 80 J/g, wherein a melting temperature of the subskin layer is less than a melting temperature of the core layer and the melting temperature of the skin layer.

* * * * *